(12) United States Patent
Weisend, Jr.

(10) Patent No.: US 6,443,394 B1
(45) Date of Patent: Sep. 3, 2002

(54) INFLATABLE AIRFOIL DEVICE

(75) Inventor: Norbert A. Weisend, Jr., Cuyahoga Falls, OH (US)

(73) Assignee: The B.F. Goodrich Company, Charlotte, NC (US)

( * ) Notice: Subject to any disclaimer, the term of this patent is extended or adjusted under 35 U.S.C. 154(b) by 105 days.

(21) Appl. No.: 09/666,996

(22) Filed: Sep. 21, 2000

(51) Int. Cl.⁷ .............................................. B64D 15/00
(52) U.S. Cl. ................................................ 244/134 A
(58) Field of Search ........................ 244/134 A, 134 R, 244/219, 214

(56) References Cited

U.S. PATENT DOCUMENTS

| | | | |
|---|---|---|---|
| 2,378,528 A | 6/1945 | Arsandaux | 244/44 |
| 2,599,059 A | 6/1952 | Jones | 244/134 |
| 2,937,826 A | 5/1960 | Johnson | 244/44 |
| 2,957,662 A | 10/1960 | Hess | 244/134 |
| 3,136,501 A | 6/1964 | Barber | 244/44 |
| 3,957,232 A * | 5/1976 | Sebrell | 244/123 |
| 4,102,519 A * | 7/1978 | Crosby, Jr. | 244/123 |
| 4,494,715 A | 1/1985 | Weisend, Jr. | 244/134 A |
| 4,561,613 A | 12/1985 | Weisend, Jr. | 244/134 A |
| 4,613,102 A | 9/1986 | Kageorge | 244/134 A |
| 4,687,159 A * | 8/1987 | Kageorge | 244/134 A |
| 4,747,575 A | 5/1988 | Putt et al. | 251/30.02 |
| 4,779,823 A | 10/1988 | Ely et al. | 244/134 A |
| 4,826,108 A | 5/1989 | Briscoe et al. | 244/134 A |
| 4,836,474 A | 6/1989 | Briscoe et al. | 244/134 A |
| 4,858,854 A * | 8/1989 | Jacobson | 114/102.29 |
| 4,865,291 A | 9/1989 | Briscoe et al. | 251/30.02 |
| 4,961,549 A | 10/1990 | LaRue | 244/134 A |
| 5,098,037 A | 3/1992 | Leffel et al. | 244/134 A |
| 5,160,102 A | 11/1992 | Hlavac | 244/134 A |
| 5,174,717 A | 12/1992 | Moore | 416/39 |
| 5,248,116 A | 9/1993 | Rauckhorst | 244/134 A |
| 5,271,598 A * | 12/1993 | Hohenshil et al. | 137/624.14 |
| 5,310,142 A | 5/1994 | Weisend, Jr. | 244/134 A |
| 5,314,145 A | 5/1994 | Rauckhorst, III | 244/134 A |
| 5,337,978 A * | 8/1994 | Fahrner et al. | 244/134 A |
| 5,393,014 A * | 2/1995 | Weisend et al. | 137/625.21 |
| 5,427,332 A | 6/1995 | Rauckhorst, III et al. | 244/134 A |
| 5,449,133 A | 9/1995 | Ely et al. | 244/134 A |
| 6,015,115 A | 1/2000 | Dorsett et al. | 244/123 |
| 6,076,776 A * | 6/2000 | Breitbach et al. | 244/214 |
| 6,347,769 B1 * | 2/2002 | To et al. | 244/219 |

FOREIGN PATENT DOCUMENTS

| | | |
|---|---|---|
| EP | 0 595 244 A1 | 5/1994 |
| FR | 950406 | 9/1949 |
| GB | 542878 | 6/1940 |

* cited by examiner

Primary Examiner—Peter M. Poon
Assistant Examiner—Kevin Jakel
(74) Attorney, Agent, or Firm—Renner, Otto, Boisselle & Sklar, L.L.P.

(57) ABSTRACT

An airfoil device (10) for attachment to the wing (14) of an aircraft (12). The airfoil device (10) has a chamber (30) which is inflatable to provide a lift-enhancing airfoil geometry to the wing (14) and other chambers (32) which are inflatable to provide deicing forces to remove ice accumulation on the wing (14). When installed on the wing (14), the airfoil device (10) closely conforms to the wing's airfoil geometry (e.g., low camber, sharp leading edge) when the lift-enhancing chamber (30) and the deicing chambers (32) are in a deflated condition. The lift-enhancing chamber (30) can be inflated during take-off and landing to provide a high camber and less sharp airfoil geometry. If ice accumulates on the wing (14) during high speed flight, the deicing chambers (32) can be repeatedly inflated/deflated for ice removal purposes.

40 Claims, 5 Drawing Sheets

INFLATABLE AIRFOIL DEVICE

FIELD OF THE INVENTION

This invention relates generally as indicated to an inflatable airfoil device and, more particularly, to an airfoil device which inflates to one shape to perform a lift-enhancing function during take-off/landing and which inflates to another shape to perform a deicing function during flight.

BACKGROUND OF THE INVENTION

The wings of an aircraft are designed to provide sufficient lift and to minimize drag. A high camber allows an aircraft to operate at lower take-off and landing speeds and thus operate on runways of reduced distances. Also, a relatively blunt leading edge ensures that the air will flow smoothly over the wing's topside during low speed flight. In contrast, during high speed flight, a low camber and a sharp leading edge translate into less drag and faster speeds for a given thrust-producing capacity. During high speed flight, ice may accumulate on the wings which can cause increased drag and, perhaps more significantly, reduced lift capacity of the affected wing whereby it is important that this ice be removed.

SUMMARY OF THE INVENTION

The present invention provides an airfoil device which inflates to one shape to perform a lift-enhancing function and which inflates to another shape to perform a deicing function.

More particularly, the present invention provides an airfoil device for attachment to the wing of an aircraft. The airfoil device has a chamber which is inflatable to provide a lift-enhancing airfoil geometry to the wing and other chambers which are inflatable to provide deicing forces to remove ice accumulation on the wing. The lift-enhancing chamber is shaped to provide, when inflated, an airfoil geometry with a higher camber and less sharp leading edge. The deicing chambers overlie the lift-enhancing chamber and the the inflated deicing chambers form a suitable arrangement (e.g., spanwise rows or a dimpled matrix) from the top margin to the bottom margin of the airfoil device.

The airfoil device can be made of a series of layers, including chamber-defining layers which define the lift-enhancing chamber and the deicing chamber. For example, the device can comprise a lift chamber-defining layer made of a non-stretchable material, another lift chamber-defining layer made of a stretchable material, a deicing chamber-defining layer made of a stretchable material, and another deicing chamber-defining layer also made of a stretchable material. The lift chamber-defining layers are joined together to define the lift-enhancing chamber and the deicing chamber-defining layers are joined together to define the deicing chambers. A base layer, adapted to be secured to the wing, can be bonded to the innermost lift chamber-defining layer and a cover layer, made of an extensible material, can be bonded to the outermost deicing chamber-defining layer.

When the airfoil device is installed to the wing of an aircraft, it will closely conform to the wing's airfoil geometry when the lift-enhancing chamber and the deicing chambers are in a deflated condition. Thus, if the wing has an airfoil geometry with a low camber and a sharp leading edge, this geometry can be maintained during high speed flight when deicing is not necessary. However, when the lift-enhancing chamber is inflated, an airfoil geometry will be provided which has a higher camber and less sharp leading edge for low speed flight. Specifically, for example, the inflated lift-enhancing chamber could have a smooth rounded shape which translates gradually into a topside and an underside of the wing, with a major portion of the shape being positioned below the leading edge of the wing.

During operation of the aircraft, the lift-enhancing chamber is inflated to enhance lift and the deicing chambers are inflated to remove ice accumulation. The deicing chambers are maintained in a deflated condition during inflation of the lift-enhancing chamber and the lift-enhancing chamber is maintained in a deflated condition during inflation of the deicing chambers. The lift-enhancing chamber can be inflated during take-off and/or landing and the deicing chambers can be inflated between take-off and landing. For example, if ice accumulates on the wing during high speed flight, the deicing chambers can be repeatedly inflated and deflated until ice is removed from the wings of the aircraft.

These and other features of the invention are fully described and particularly pointed out in the claims. The following description and annexed drawings set forth in detail a certain illustrative embodiment of the invention, this embodiment being indicative of but one of the various ways in which the principles of the invention may be employed.

DETAILED DESCRIPTION

Figure 1:
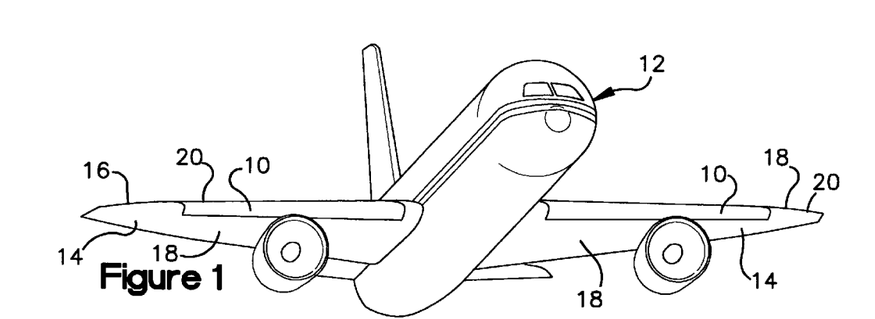
FIG. 1 is a schematic perspective view of an aircraft having an airfoil device according the present invention installed on each of its wings, each airfoil device having an inflatable chamber which is inflatable for lift-enhancing purposes and other inflatable chambers which are inflatable for deicing purposes.

Referring now to the drawings, and initially to FIG. 1, inflatable airfoil devices 10 according to the present invention are shown installed on an aircraft 12 and, more particularly, on the aircraft's wings 14. The wings 14 each have a topside 16, an underside 18, and a leading edge 20 therebetween. In the illustrated aircraft 12, the wings 14 are characterized by a low camber and a sharp thin leading edge 20.

Figure 2:
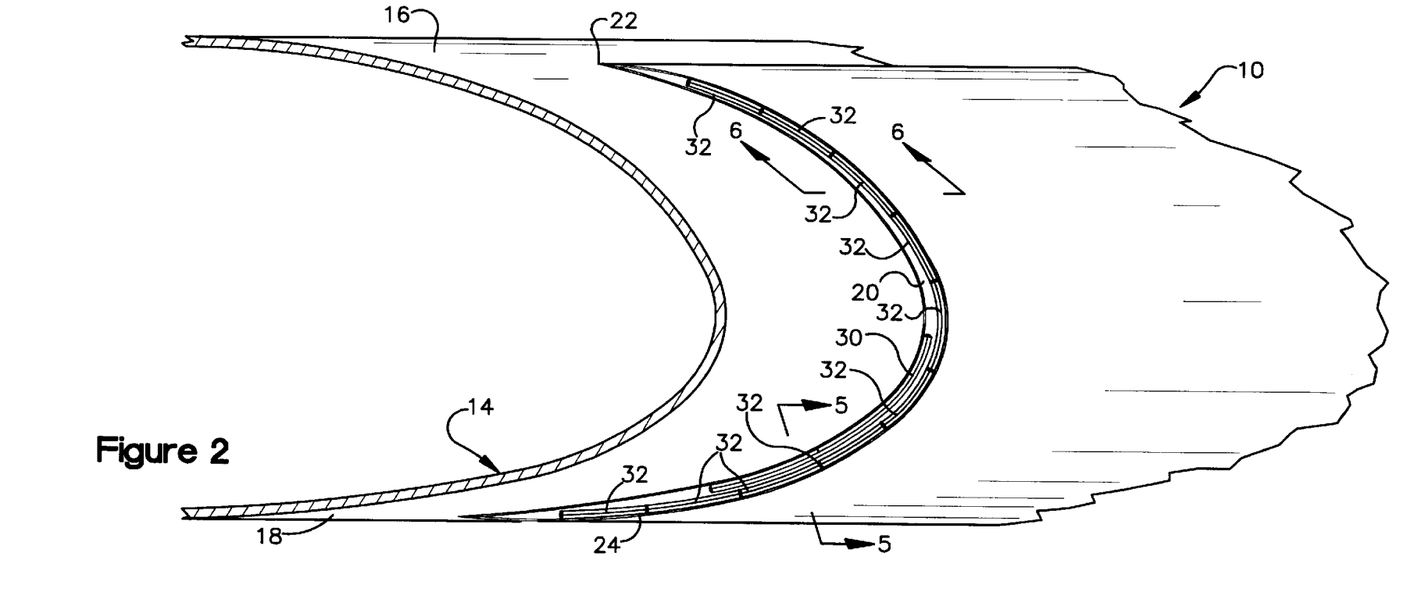
FIG. 2 is a perspective partially cut-away view of the airfoil device with the lift-enhancing chamber being shown in a deflated condition and the deicing chambers also being shown in a deflated condition.
Figure 3:
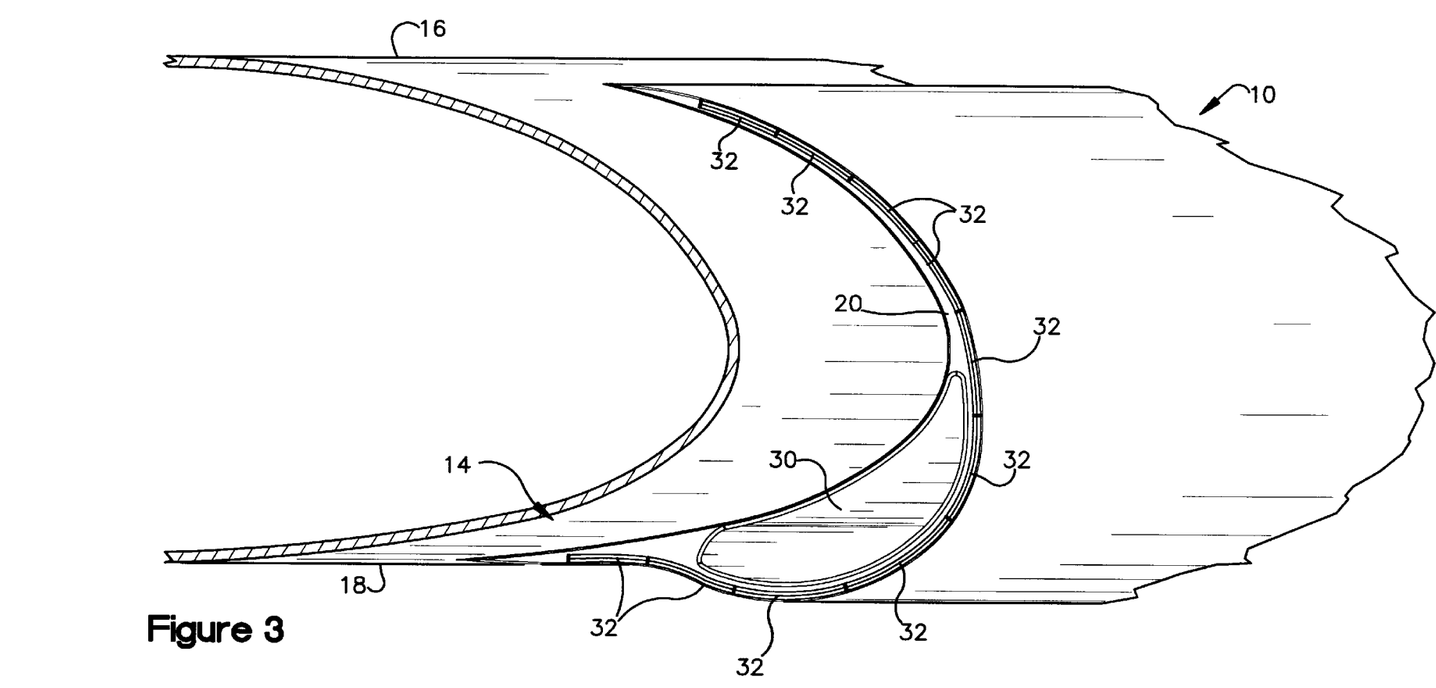
FIG. 3 is a perspective partially cut-away view of the airfoil device with the lift-enhancing chamber being shown in an inflated condition and the deicing chambers being shown in a deflated condition.
Figure 4:
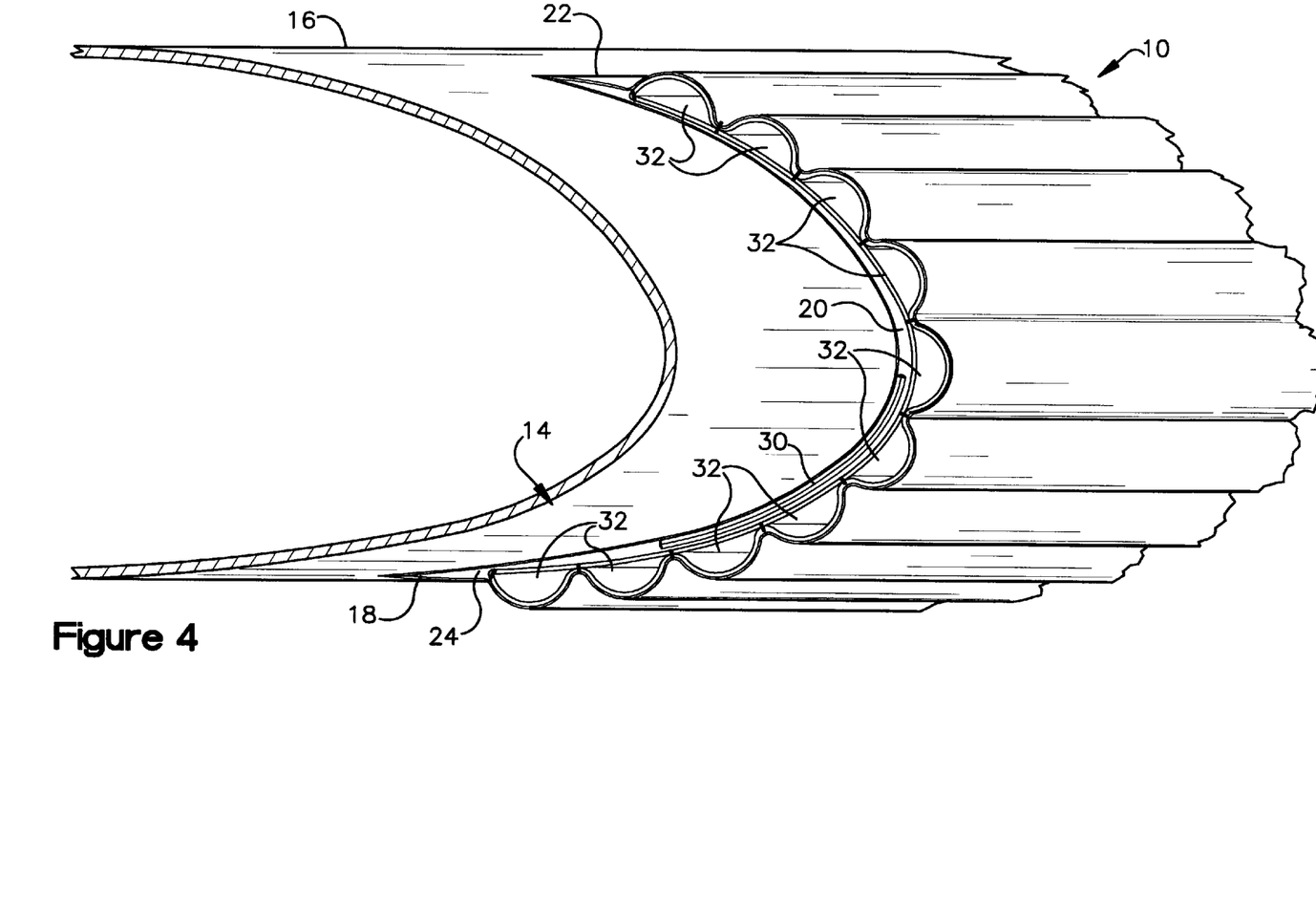
FIG. 4 is a perspective partially cut-away view of the airfoil device with the lift-enhancing chamber being shown in a deflated condition and the deicing chambers being shown in an inflated condition.

Referring now additionally to FIGS. 2–4, a top margin 22 of the airfoil device 10 is positioned on the topside 16 of the wing 14 and a bottom margin 24 of the airfoil 10 is positioned on the underside 18 of the wing 14. The airfoil device 10 has an inflatable chamber 30 which is inflatable for lift-enhancing purposes and other inflatable chambers 32 which are inflatable for deicing purposes. Although not specifically shown in the drawings, a source of pressure/suction communicates with chambers 30 and 32 so that they may be selectively inflated/deflated during operation of the aircraft 12. The lift-enhancing chamber 30 is positioned on the underside 18 of the wing 14 and the deicing chambers 32 are positioned in spanwise rows extending from the device's top margin 22 to its bottom margin 24.

As shown in FIG. 2, when neither the lift-enhancing function nor the deicing function is required, the chambers 30 and 32 remain in a deflated condition and conform closely to the wing 14. The resulting airfoil geometry has a low camber and a sharp leading edge translating into less drag and faster speeds for a given thrust-producing capacity. Suction may be applied to the chamber 30 and/or the chambers 32 to insure that they remain in the desired deflated condition.

As shown in FIG. 3, during low speed flight (e.g., take-off and landing), the chamber 30 is inflated to provide an airfoil geometry having a higher camber and a less sharp leading edge. The inflated chamber 30 has a smooth rounded shape which translates gradually into the topside 16 and underside 18 of the wing 14, with the major portion of the inflated chamber being positioned below the wing's leading edge 20. The chamber 30 remains inflated until the aircraft 12 reaches a speed sufficient for its high speed airfoil geometry (in the case of takeoff) or until the aircraft 12 is grounded (in the case of landing). When the chamber 30 is inflated, the chambers 32 remain in a deflated condition conforming closely to the topside 16 of the wing 14 and the inflated chamber 30. Suction can be applied to the chambers 32, if necessary, to insure that they maintain this desired deflated condition.

As shown in FIG. 4, during high speed flight when deicing is required, the chambers 32 are inflated for ice removal purposes. Usually, the chambers 32 will be systemically inflated and deflated to break up the accumulated ice into small pieces. When the chambers 32 are being inflated, the chamber 30 remains in a deflated condition conforming closely to the underside 18 and leading edge 20 of the wing 14. Suction can be applied to the chamber 30, if necessary, to insure that it maintains the desired deflated condition.

Figure 5:
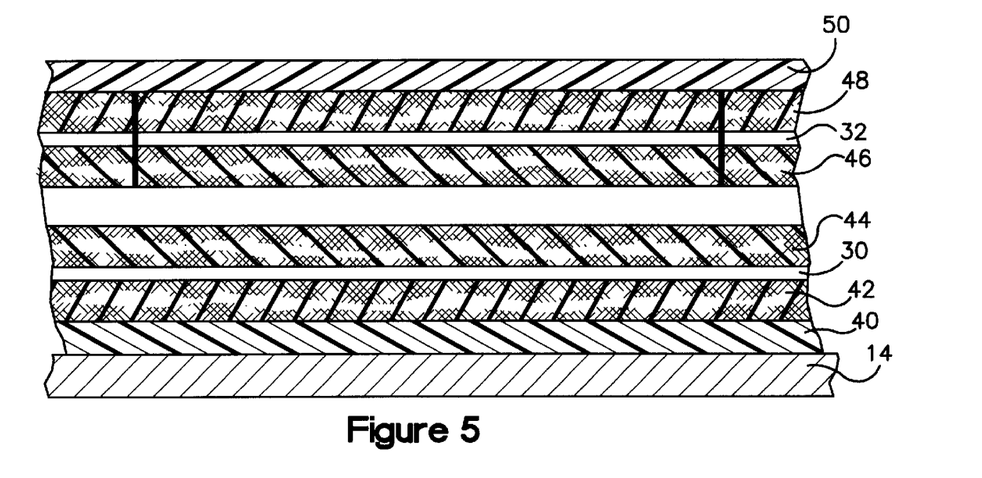
FIG. 5 is a schematic sectional view showing the different layers of the airfoil device as seen along line 5—5 in FIG. 3.
Figure 6:
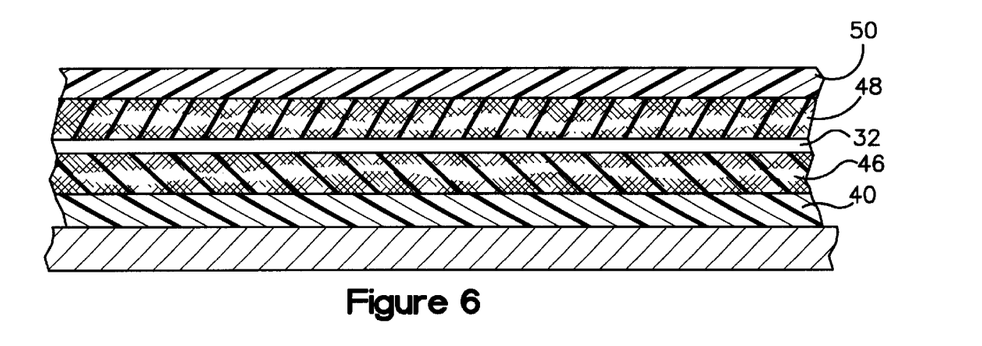
FIG. 6 is a schematic sectional view showing the different layers of the airfoil device as seen along line 6—6 in FIG. 3.

Referring now to FIGS. 5 and 6, the airfoil device 10 comprises a series of layers which, in the illustrated embodiment, are a base layer 40, chamber-defining layers 42, 44, 46, and 48, and a cover layer 50. The base layer 40 is made of a material suitable for installation (e.g., neoprene) and is bonded (e.g., cemented) to the wing 14 to attach the airfoil device 10 thereto. The cover layer 50 is made of an extensible material suitable for protecting the underlying layers against weathering (e.g., neoprene) and is bonded to the outermost chamber-defining layer 48. These layers 40 and 50 extend across the span, and transversely from the top margin 22 to the bottom margin 24, of the airfoil device 10.

Figure 7:
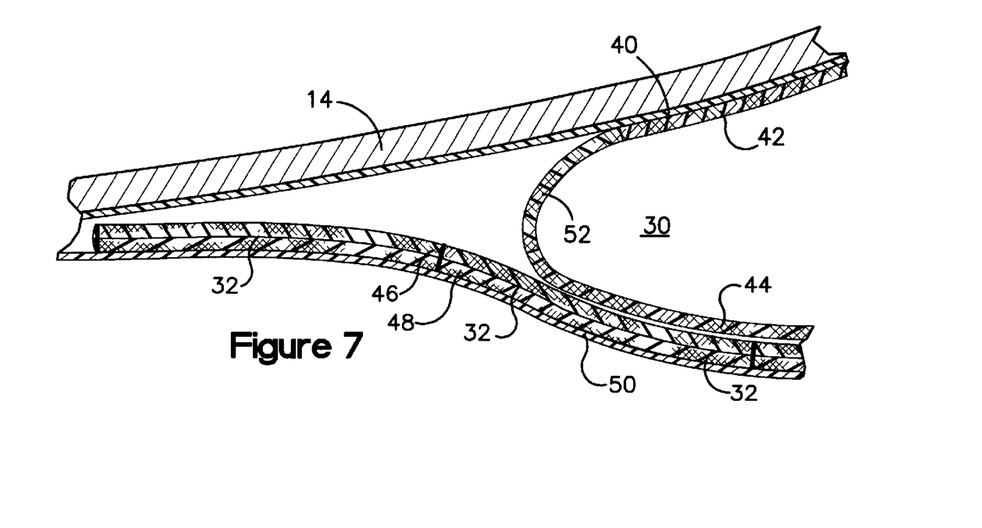
FIG. 7 is a schematic sectional view showing a transitional corner of the layers forming the lift-enhancing chamber.

The innermost chamber-defining layer 42 is made of a non-stretchable fluid-impervious material (e.g., rubber coated square woven nylon) and the adjacent chamber-defining layer 44 is made of a stretchable fluid-impervious material (e.g., rubber coated knit nylon). These layers 42 and 44 define the chamber 30 and extend across the span of the airfoil device 10. However, the layers 42 and 44 need not extend transversely from the top margin 22 to the bottom margin 24 and can extend from a location aligned with the leading edge 20 of the wing 14 (or just slightly above or below) to the underside 18 of the wing 14. (Compare FIGS. 5 and 6.) The innermost layer 42 is bonded to the base layer 40 and the adjacent layer 44 is attached to the layer 42 along the spanwise perimeter of the chamber 30. This attachment can be accomplished by the attaching ends of the layer 44 forming extensible corner pieces 52 that can stretch during inflation of the chamber 30. (See FIG. 7.) Alternatively, separate corner pieces can be used.

The chamber-defining layer 46 and outermost chamber-defining layer 48 are each made of a stretchable fluid-impervious material (e.g., rubber coated knit nylon). These layers 46 and 48 define the chambers 32 and extend across the span, and transversely from the top margin 22 to the bottom margin 24, of the airfoil device 10. The outermost layer 48 is bonded to the cover layer 50 which extends therewith during inflation of the chambers 32. The adjacent layer 46 is attached to the layer 48 (e.g., by stitching) along the spanwise perimeters of the chambers 32. Because the layer 46 is made of a stretchable material, it is able to extend during inflation of the chamber 30. (See FIG. 3.)

Accordingly, the chambers 30 and 32 may be appropriately inflated/deflated during operation of the aircraft 12. Specifically, during take-off of the aircraft 12, the lift-enhancing chamber 30 may be inflated to provide an airfoil geometry with a higher camber and a blunter leading edge. Once the aircraft 12 reaches a sufficient speed, the chamber 30 may be deflated thereby providing an airfoil geometry with a low camber and sharp leading edge. If ice accumulates on the wings 14 during high speed flight, the deicing chambers 32 may be inflated for ice removal purposes. When the aircraft 12 is landing, the lift-enhancing chamber 30 may again be inflated for low speed flight. When the lift-enhancing chamber 30 is inflated, the deicing chambers 32 are maintained in a deflated condition, and, when the deicing chambers 32 are inflated, the lift-enhancing chamber 30 is maintained in a deflated condition.

Figure 8:
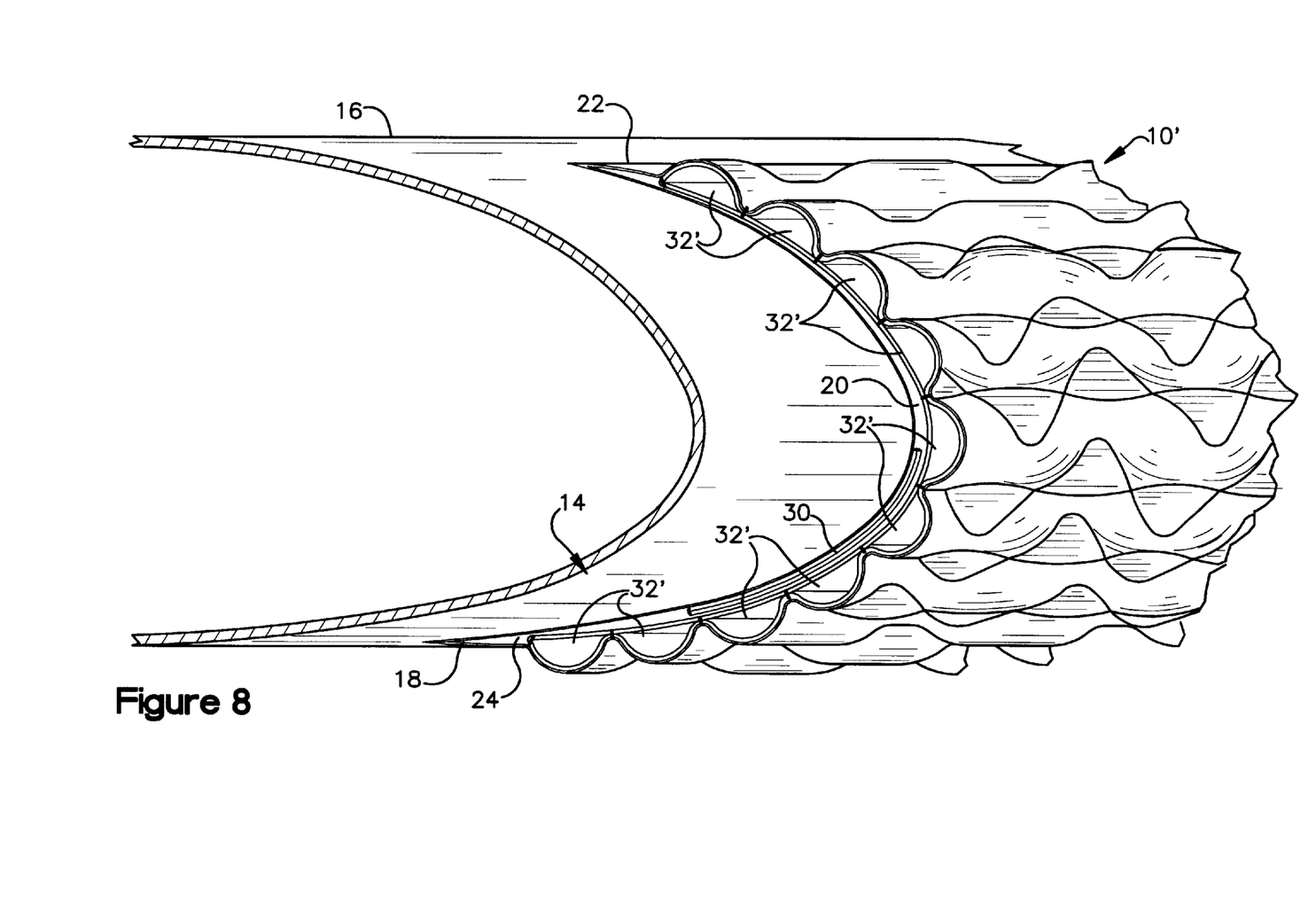
FIG. 8 is a perspective partially cut-away view of an inflatable airfoil device according to the present invention having modified deicing chambers, the lift-enhancing chamber being shown in a deflated condition and the modified deicing chambers being shown in an inflated condition.

In the embodiment illustrated in FIGS. 2–4, the deicing chambers 32 are positioned in spanwise rows. In a modified version 10' of the airfoil device shown in FIG. 8, the chambers 32' are instead in a "dimpled" pattern. The advantages of such a geometric pattern of dimples or depressions, and stitching patterns between layers 46 and 48 which may be used to acquire such a pattern, are discussed and described in U.S. Pat. No. 5,310,142. This patent is owned by the assignee of the present invention and its entire disclosure is hereby incorporated by reference. In either case (i.e., spanwise row pattern or dimpled pattern), the deicing chambers 32/32' extend from the top margin 22 to the bottom margin 24 of the airfoil device 10/10' so that they overlay the topside 16, the underside 18, and the leading edge 20 of the wing 14.

One may now appreciate that the present invention provides an airfoil device 10 which inflates to one shape to perform a lift-enhancing function during take-off/landing and which inflates to another shape to perform a deicing function during flight. Although the invention has been shown and described with respect to a certain preferred embodiment, equivalent and obvious alterations and modifications will occur to others skilled in the art upon the reading and understanding of this specification. The present invention includes all such alterations and modifications and is limited only by the scope of the following claims.

What is claimed is:

1. An airfoil device for attachment to the wing of an aircraft, said airfoil device comprising:
   a base layer for attachment to the wing of the aircraft;
   a lift-enhancing chamber positioned over said base layer which is inflatable to provide a lift-enhancing airfoil geometry to the wing; and
   deicing chambers positioned over said base layer which are inflatable to provide deicing forces to remove ice accumulation on the wing.

2. An airfoil device as set forth in claim 1, wherein the lift-enhancing chamber is shaped so that the lift-enhancing airfoil geometry has a higher camber and less sharp leading edge than an airfoil geometry provided when the lift-enhancing chamber is deflated.

3. An airfoil device as set forth in claim 2, wherein the inflated chamber has a smooth rounded shape adapted for gradual translation into a topside and an underside of the wing.

4. An airfoil device as set forth in claim 1, wherein some of the deicing chambers overlie the lift-enhancing chamber.

5. An airfoil device as set forth in claim 1, comprising a top margin and a bottom margin, and wherein the inflated deicing chambers form a spanwise row arrangement from the top margin to the bottom margin.

6. An airfoil device as set forth in claim 1, comprising a top margin and a bottom margin, and wherein the inflated deicing chambers form a dimpled matrix arrangement from the top margin to the bottom margin.

7. An airfoil device as set forth in claim 1, comprising chamber-defining layers which define the lift-enhancing chamber and the deicing chamber.

8. An airfoil device as set forth in claim 7, wherein the chamber-defining layers are made of coated fabric materials.

9. In combination, the airfoil device of claim 1 and an aircraft, the airfoil device being attached to a wing of the aircraft.

10. A combination as set forth in claim 9, wherein the wing has an airfoil geometry and wherein the airfoil device closely conforms to this airfoil geometry when the lift-enhancing chamber and the deicing chambers are in a deflated condition.

11. A combination as set forth in claim 10, wherein the wing's airfoil geometry has a low camber and a sharp leading edge.

12. A combination as set forth in claim 9, wherein the airfoil device provides an airfoil geometry when the lift-enhancing chamber is inflated which has a higher camber and less sharp leading edge than the airfoil geometry of the wing.

13. A combination as set forth in claim 12, wherein the inflated lift-enhancing chamber has a smooth rounded shape which translates gradually into a topside and an underside of the wing, a major portion of the shape being positioned below the leading edge of the wing.

14. A method of operating an aircraft comprising the steps of:
   installing the airfoil device of claim 1 on a wing of the aircraft;
   inflating the lift-enhancing chamber to enhance lift; and
   inflating the deicing chambers to remove ice accumulation.

15. A method as set forth in claim 14, further comprising the step of maintaining the deicing chambers in a deflated condition during inflation of the lift-enhancing chamber and maintaining the lift-enhancing chamber in a deflated condition during inflation of the deicing chambers.

16. A method as set forth in claim 15, further comprising the step of maintaining the deicing chambers in a deflated condition during inflation of the lift-enhancing chamber.

17. A method as set forth in claim 16, wherein said maintaining step comprises applying suction to the deicing chamber to maintain them in the deflated condition.

18. A method as set forth in claim 14, further comprising the step of maintaining the lift-enhancing chamber in a deflated condition during inflation of the deicing chambers.

19. A method as set forth in claim 14, further comprising the step of maintaining the lift-enhancing chamber and the deicing chambers in a deflated condition when said inflating steps are not being performed.

20. A method as set forth in claim 14, wherein said step of inflating the deicing chambers comprises repeatedly inflating and deflating the deicing chambers until ice is removed from the wings of the aircraft.

21. An airfoil device for attachment to the wing of an aircraft, said airfoil device comprising:
   a lift-enhancing chamber which is inflatable to provide a lift-enhancing airfoil geometry to the wing;
   deicing chambers which are inflatable to provide deicing forces to remove ice accumulation on the wing; and.
   chamber-defining layers which define the lift-enhancing chamber and the deicing chamber;
   wherein two of the chamber-defining layers define the lift-enhancing chamber and another two of the chamber-defining layers define the deicing chambers.

22. An airfoil device as set forth in claim 21, wherein the deicing chamber-defining layers overlay the lift chamber-defining layers.

23. An airfoil device as set forth in claim 22, wherein the deicing chamber-defining layers extend beyond the lift chamber-defining layers in a transverse direction.

24. An airfoil device as set forth in claim 21, wherein an outermost one of the lift chamber-defining layers and an innermost one of the deicing chamber-defining layers contact each other.

25. An airfoil device as set forth in claim 24, wherein the outermost lift chamber-defining layer and the innermost deicing chamber-defining layer are unattached to each other in contacting regions overlying the lift-enhancing chamber.

26. An airfoil device as set forth in claim 21, wherein the innermost lift chamber-defining layer is made of a non-stretchable material and the other lift chamber-defining layer is made of a stretchable material.

27. An airfoil device as set forth in claim 26, further comprising a base layer adapted to be secured to the wing, the innermost lift chamber-defining layer being bonded to the base layer.

28. An airfoil device as set forth in claim 26, wherein the lift chamber-defining layers are attached to each other at spanwise perimeter edges of the lift-enhancing chamber with extensible corner pieces.

29. An airfoil device as set forth in claim 28, wherein the extensible corner pieces comprise end portions of the lift chamber-defining layer made of the stretchable material.

30. An airfoil device as set forth in claim 21, wherein the deicing chamber-defining layers are each made of a stretchable material.

31. An airfoil device as set forth in claim 30, further comprising a cover layer made of extensible material and bonded to an outermost one of the deicing chamber-defining layers.

32. An airfoil device for attachment to the wing of an aircraft, said airfoil device comprising:
   a lift-enhancing chamber which is inflatable to provide a lift-enhancing airfoil geometry to the wing;

deicing chambers which are inflatable to provide deicing forces to remove ice accumulation on the wing;

chamber-defining layers which define the lift-enhancing chamber and the deicing chamber;

an inner lift chamber-defining layer made of a non-stretchable material and another lift chamber-defining layer made of a stretchable material, the lift chamber-defining layers being joined together to define the lift-enhancing chamber; and an outer deicing chamber-defining layer made of a stretchable material and another deicing chamber-defining layer also made of a stretchable material, the deicing chamber-defining layers being joined together to define the deicing chambers.

33. An airfoil device for attachment to the wing of an aircraft, said airfoil device comprising:

a lift-enhancing chamber which is inflatable to provide a lift-enhancing airfoil geometry to the wing;

deicing chambers which are inflatable to provide deicing forces to remove ice accumulation on the wing; and a base layer adapted to be secured to the wing and bonded to the innermost lift chamber-defining layer and a cover layer made of an extensible material and bonded to the outermost deicing chamber-defining layer.

34. An airfoil device as set forth in claim 33, comprising a top margin and a bottom margin, and wherein the base layer and the cover layer extend across the span, and transversely from the top margin to the bottom margin.

35. In combination an airfoil device and an aircraft, the airfoil device being attached to a wing of the aircraft, wherein the airfoil device comprises:

a lift-enhancing chamber which is inflatable to provide a lift-enhancing airfoil geometry to the wing;

deicing chambers which are inflatable to provide deicing forces to remove ice accumulation on the wing;

an inner lift chamber-defining layer made of a non-stretchable material and another lift chamber-defining layer made of a stretchable material, the lift chamber-defining layers being joined together to define the lift-enhancing chamber; and an outer deicing chamber-defining layer made of stretchable material and another deicing chamber-defining layer also made of a stretchable material, the deicing chamber-defining layers being joined together to define the deicing chambers; and a base layer bonded to the inner lift chamber-defining layer and attached to the wing.

36. A method of operating an aircraft comprising the steps of:

installing an airfoil device, comprising a lift-enhancing chamber which is inflatable to provide a lift-enhancing airfoil geometry to the wing and deicing chambers which are inflatable to provide deicing forces to remove ice accumulation on the wing, on a wing of the aircraft;

inflating the lift-enhancing chamber to enhance lift;

inflating the deicing chambers to remove ice accumulation; and maintaining the lift-enhancing chamber in a deflated condition during inflation of the deicing chambers;

wherein said maintaining step comprises applying suction to the lift-enhancing chamber to maintain it in the deflated condition.

37. A method of operating an aircraft comprising the steps of:

installing an airfoil device, comprising a lift-enhancing chamber which is inflatable to provide a lift-enhancing airfoil geometry to the wing and deicing chambers which are inflatable to provide deicing forces to remove ice accumulation on the wing, on a wing of the aircraft;

inflating the lift-enhancing chamber to enhance lift;

inflating the deicing chambers to remove ice accumulation; and maintaining the lift-enhancing chamber and the deicing chambers in a deflated condition when said inflating steps are not being performed;

wherein said maintaining step comprises applying suction to the lift-enhancing chamber and the deicing chambers to maintain them in their deflated conditions.

38. A method of operating an aircraft comprising the steps of:

installing an airfoil device, comprising a lift-enhancing chamber which is inflatable to provide a lift-enhancing airfoil geometry to the wing and deicing chambers which are inflatable to provide deicing forces to remove ice accumulation on the wing, on a wing of the aircraft;

inflating the lift-enhancing chamber to enhance lift; and inflating the deicing chambers to remove ice accumulation;

wherein said step of inflating the lift-enhancing chamber is performed during take-off and/or landing and wherein said step of inflating the deicing chambers is performed between take-off and landing.

39. A method of operating an aircraft comprising the steps of:

installing an airfoil device, comprising a lift-enhancing chamber which is inflatable to provide a lift-enhancing airfoil geometry to the wing and deicing chambers which are inflatable to provide deicing forces to remove ice accumulation on the wing, on each of the wings of the aircraft;

inflating the lift-enhancing chambers to enhance lift during take-off while maintaining the deicing chambers in a deflated condition;

deflating the lift-enhancing chamber after take-off; and inflating the deicing chambers to remove ice accumulation after take-off while maintaining the lift-enhancing chambers in a deflated condition.

40. A method as set forth in claim 39, further comprising the step of inflating the lift-enhancing chambers to enhance lift during landing while maintaining the deicing chambers in a deflated condition.

* * * * *

UNITED STATES PATENT AND TRADEMARK OFFICE
CERTIFICATE OF CORRECTION

PATENT NO.    : 6,443,394 B1
DATED         : September 3, 2002
INVENTOR(S)   : Norbert A. Weisand, Jr.

It is certified that error appears in the above-identified patent and that said Letters Patent is hereby corrected as shown below:

<u>Column 6,</u>
Line 1, "claim 15" should read -- claim 14 --.

Signed and Sealed this

Twentieth Day of May, 2003

JAMES E. ROGAN
*Director of the United States Patent and Trademark Office*